United States Patent
Eyb et al.

[15] 3,680,654
[45] Aug. 1, 1972

[54] BEARING FOR VEHICLE WHEELS, PARTICULARLY FOR DRIVEN WHEELS OF AUTOMOBILES

[72] Inventors: Wolfgang Eyb, Leonberg; Robert Klosterhuber, Stuttgart-Zuffenhausen, both of Germany

[73] Assignee: Firma Dr. Ing. h.c.F. Porsche KG, Stuttgart-Zuffenhausen, Germany

[22] Filed: Dec. 16, 1969

[21] Appl. No.: 885,428

[30] Foreign Application Priority Data
Jan. 22, 1969 Germany ............ P 19 02 942.6

[52] U.S. Cl. .................................. 180/48 R
[51] Int. Cl. .................................... B60k 17/30
[58] Field of Search .......................... 180/48, 43

[56] References Cited

UNITED STATES PATENTS

| 1,960,457 | 5/1934 | Roche | 180/43 R |
| 2,349,388 | 5/1944 | Sturges | 180/43 R |
| 2,402,562 | 6/1946 | Lewis | 180/43 R |
| 2,503,477 | 4/1950 | Gregory | 180/48 R |
| 2,547,435 | 4/1951 | Bouchard | 180/43 R |
| 1,922,962 | 8/1933 | Lambert | 180/43 |
| 2,156,601 | 5/1939 | Mosling et al. | 180/43 UX |
| 2,599,013 | 6/1952 | Pringle | 180/43 UX |
| 2,822,880 | 2/1958 | Gregory | 180/48 |
| 3,283,842 | 11/1966 | Watt | 180/48 |

FOREIGN PATENTS OR APPLICATIONS

| 9,751 | 4/1909 | Great Britain | 180/48 |

Primary Examiner—A. Harry Levy
Attorney—Craig, Antonelli and Hill

[57] ABSTRACT

A vehicle wheel bearing wherein the drive is effected by means of a universal joint with the joint component thereof associated with the vehicle wheel being held by a hub receiving the wheel bearing constructed as a multiple-row antifriction bearing disposed approximately on the central plane of the rim beside the universal joint. The hub of the antifriction bearing is provided with wheel studs distributed uniformly along the circumference and serve for receiving and holding the universal-joint housing, a brake plate, and the wheel rim.

5 Claims, 2 Drawing Figures

3,680,654

1

BEARING FOR VEHICLE WHEELS, PARTICULARLY FOR DRIVEN WHEELS OF AUTOMOBILES

BACKGROUND OF THE INVENTION

The present invention relates to a bearing of vehicle wheels, and more particularly, to a bearing wherein the drive is effected by means of a universal joint and the joint member of this universal joint associated with the vehicle wheel being held by a hub receiving the wheel bearing. It is the purpose of the present invention to provide a simple and inexpensive bearing for the universal-joint drive shaft and for the wheel hub in vehicle wheels of automobiles.

In conventional constructions of wheel bearings for automotive vehicle wheels with a drive joint disposed outside of the central plane of the rims, several antifriction bearings are required as shown in German Patent 825,350. Consequently, these bearings must be dimensioned correspondingly large so that the angular mobility of the universal-joint shaft is not disadvantageously influenced. As a result thereof, an expensive and space-wasting wheel mounting and large, unsprung wheel masses are produced. In addition, any repair work that may become necessary requires a cumbersome and time-consuming dismantling of individual wheel parts, thereby incurring considerably costs.

SUMMARY OF THE INVENTION

It is the aim of the present invention to overcome the underlying problem of providing a wheel bearing for driven wheels of automotive vehicles, which is distinguished by low space requirements, as well as a simple construction.

The foregoing problem is solved in accordance with the present invention by constructing the wheel bearing as a multiple-row antifriction bearing disposed approximately in the central plane of the rim beside the universal joint. Advantageously, the antifriction bearing inserted in the wheel carrier has approximately the same external dimensions as the universal joint serving for the wheel drive. It is furthermore advantageous that the hub of the antifriction bearing is provided with wheel studs or bolts distributed uniformly along the circumference. These wheel studs can serve for receiving and holding the universal-joint housing, a brake plate or disk, and the wheel rim.

By providing the above-mentioned structure in accordance with the present invention, it is possible to give the universal joint, as well as the antifriction bearing, optimum dimensions, whereby the manufacturing costs can be lowered considerably. It is of further advantage to select a common mounting of rim, brake plate, and universal joint at the hub of the antifriction bearing. Due to this feature, it is possible to dismantle components quickly and inexpensively, in case of need.

BRIEF DESCRIPTION OF THE DRAWINGS

These and further features, advantages, and objects of the present invention will become more apparent from the following description when taken in conjunction with the accompanying drawings which show, for purposes of illustration only, several embodiments in accordance with the present invention and wherein:

2

Figure 1:
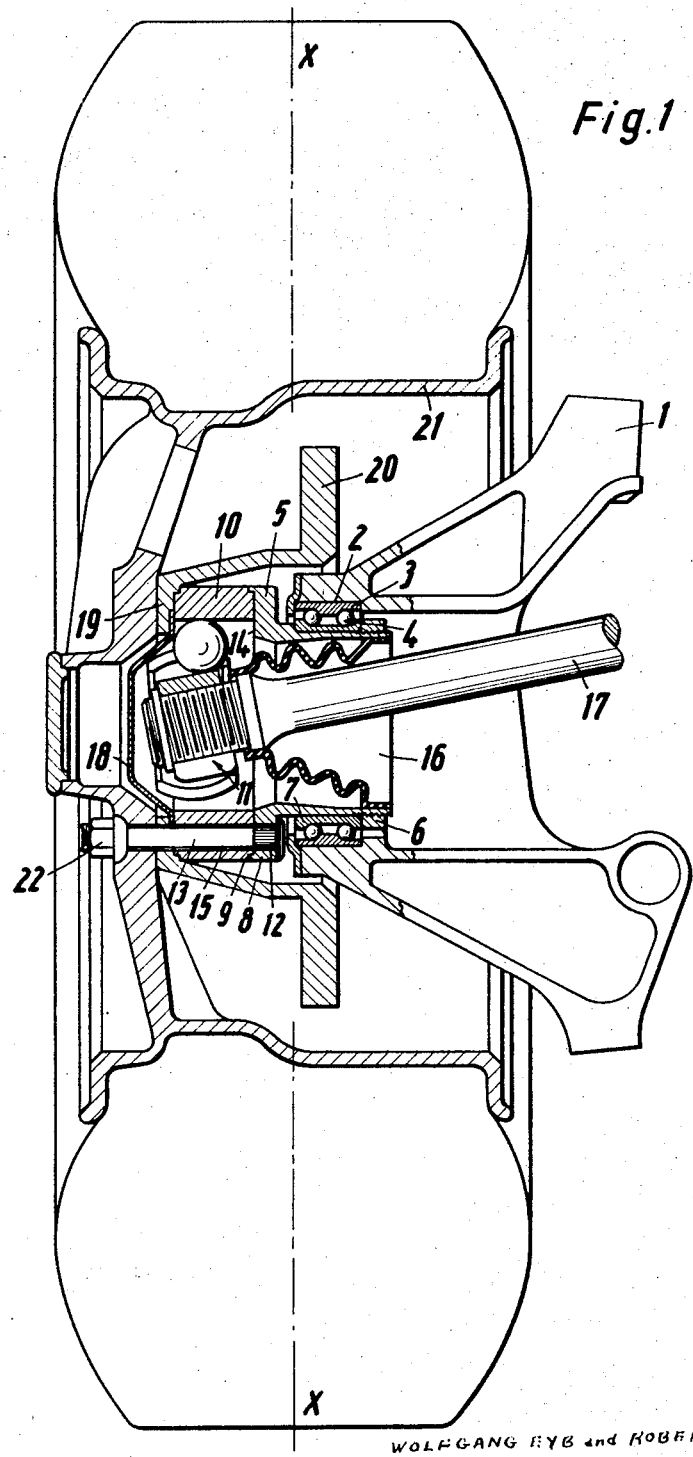
Figure 2:
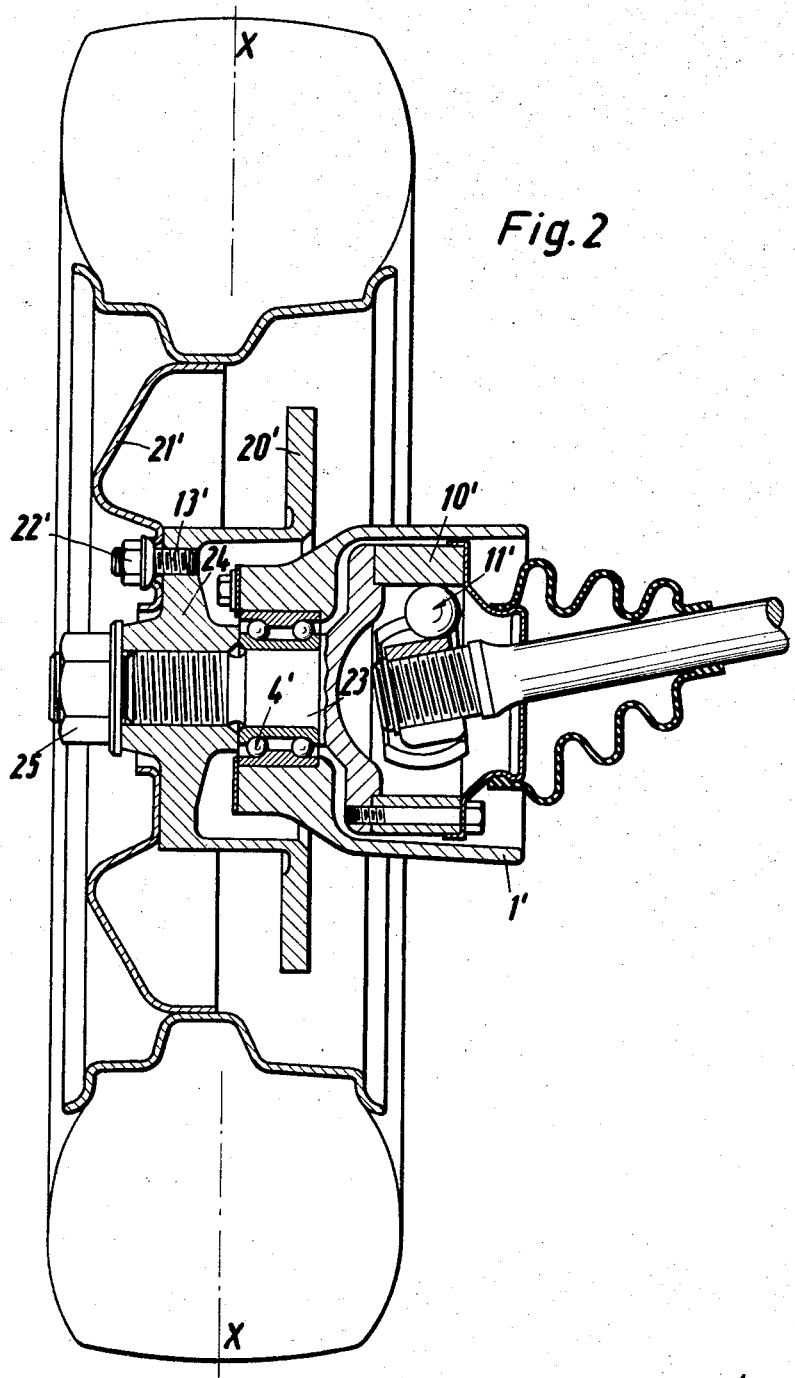

FIG. 1 is a longitudinal sectional view of the wheel bearing for an automotive vehicle according to the present invention, with a universal joint engaging outside of the central plane of the rim, and FIG. 2 is a longitudinal sectional view of another wheel bearing according to the present invention.

DETAILED DESCRIPTION OF THE DRAWINGS

Referring now to the drawings and, in particular to FIG. 1, the wheel bearing consists of a wheel carrier 1 having a recess 2 for an outer ring 3 of a multiple-row antifriction bearing 4. The recess 2 is disposed in such a manner that the antifriction bearing 4 is placed approximately in the central plane X—X of the rim. The multiple-row antifriction bearing 4 is disposed on a hub 5 and is held by means of a set or adjusting nut 6, which is associated with the inner ring 7 of the antifriction bearing 4. The hub 5 is a hollow element and has a flange 8. The flange 8 is provided with centering or guide surfaces 9 for centering the housing 10 of a universal joint 11 and has bores 12 uniformly distributed along the circumference, into which wheel studs 13 are forcibly inserted for rotation therewith.

The housing 10 of the universal joint 11 is arranged at the front face 14 of the flange 8. The housing 10 has bores 15 for being connected with the wheel studs 13 of the hub 5 for rotation therewith. The universal joint 11 is protected by a joint protection cover sleeve 16, which is attached to the hub 5 and to the universal-joint shaft 17. A dust-protection cap 18 is placed on the housing 10 of the universal joint 11. The dust-protection cap 18 is held by the flange 19 of a brake disk 20. The brake disk 20 is centrally held at the housing 10 of the universal joint 11. A wheel rim 21 is associated with the brake disk 20. The wheel rim 21 and the brake disk 20 are held secured against individual rotation by means of the wheel studs 13. In order to mount the wheel rim 21 on the brake disk and the housing 10 of the universal joint 11, wheel nuts 22 are provided, which are associated with the wheel studs 13. The tightening torque of these nuts, by way of the wheel rim 21, presses the brake disk 20 toward the universal-joint housing 10 against the flange 8 of the hub 5. By means of the wheel nuts 22, the wheel rim 21 is simultaneously centered.

In the wheel bearing of FIG. 2, the same parts are provided with identical reference numerals except that the numerals are primed. The housing 10' of the universal joint 11' is connected with a wheel spindle 23 for rotation therewith. The wheel spindle 23 carries a multiple-row antifriction bearing 4' which is provided approximately in the central plane X—X of the rim in the wheel carrier 1 and is held on the wheel spindle 23 by a hub 24 of a brake disk 20'. A retaining nut 25 is provided for mounting the brake disk 20'. The wheel rim 21' is attached to the wheel studs 13', which are inserted in the hub 24 of the brake plate 20', and is centered and retained by wheel nuts 22'.

In order to mount the vehicle wheel shown in FIG. 1, the wheel studs 13 are first inserted in the bores 12 of the flange 8, and the antifriction bearing 4 is placed, with its inner ring 7, on the hub 5 and held by the set nut 6. The thus-prepared hub 5 is inserted, with the outer ring 3, in the recess 2 of the wheel carrier 1, and held in this position. Then, the housing 10 of the universal joint 11 is placed, along with the bores 15, on the wheel studs 13 and pressed against the flange 8 of the hub 5, whereby the housing 10 is positioned against the centering surfaces 9 of the flange 8 of the hub 5. The joint protection cover sleeve 16 is attached the hub 5. The dust cap 18, in contact with the housing 10 of the universal joint 11, is attached to the wheel studs 13. After mounting the brake disk 20 to the wheel studs 13, the wheel rim 21 is placed on the wheel studs 13 and attached by means of the wheel nuts 22. During this procedure, the brake disk 20 and the housing 10 of the universal joint 11 are tensioned with respect to the hub 5, whereby these parts obtain an exact and firm hold.

In the wheel assembly of FIG. 2, the antifriction bearing 4' is placed on the wheel spindle 23. The thus-prepared wheel spindle 23 is inserted in the wheel carrier 1' and connected with the housing 10' of the universal joint 11'. Thereafter, the brake disk 20' is placed along with the hub portion 24, over the wheel spindle 23 until the hub portion is in contact with the antifriction bearing 4'. The brake disk 20' is clamped, and thus held, on the wheel spindle 23 by means of a retaining nut 25. The wheel rim 21' is now placed on the wheel studs 13' inserted in the hub 24 of the brake disk 20', and attached by means of wheel nuts 22'. The disassembly of the above-described bearing for the wheels of automotive vehicles is conducted in an analogously reversed sequence.

While we have shown and described only two embodiments in accordance with the present invention, it is to be clearly understood that the same is susceptable to numerous changes and modifications as will be apparent to a person having ordinary skill in the art, and we, therefore, do not wish to be limited to the details shown and described herein but intend to cover all such changes and modifications that are within the scope of the present invention.

It is claimed:

1. A wheel bearing and support for vehicles, especially for the driven wheels of automotive vehicles wherein universal joint means effect the drive, comprising an annular wheel rim means defining a substantially cylindrical space therewithin and having a central plane extending perpendicularly with respect to the axis of said cylindrical space, a hub means, wheel bearing means disposed approximately in said central plane, said bearing means being constructed as a multi-row bearing having an inner and an outer race, the inner race resting on one portion of the hub means, a universal drive joint means having a housing which is operatively held by said hub means, said bearing means and said joint means being disposed side by side along the axis of said cylindrical space and entirely within said cylindrical space and wherein said joint means is disposed outwardly from the bearing means with respect to the center line of the vehicle.

2. A wheel bearing and support according to claim 1, characterized in that the outer race of the bearing means is in engagement with a wheel carrier, said wheel carrier being attachable to a frame structure of the vehicle, and said bearing means having a maximum diameter approximately the same as the maximum diameter of the universal joint means housing.

3. A wheel bearing and support according to claim 1, characterized in that the hub means includes a plurality of stud bolts arranged circumferentially thereon, said stud bolts being arranged to accommodate and support the housing, a brake disc, and wheel rim, said brake disc being supported within the confines of the cylindrical space.

4. A wheel bearing and support according to claim 1, characterized in that said hub means and said joint housing are in abutting contact with each other.

5. A wheel bearing and support according to claim 4, characterized in that said hub means and said joint housing are solidly and non-rotatably connected with one another.

* * * * *